W. F. WARREN.
AUTOMOBILE PUMP.
APPLICATION FILED JAN. 28, 1919.
1,346,866. Patented July 20, 1920.
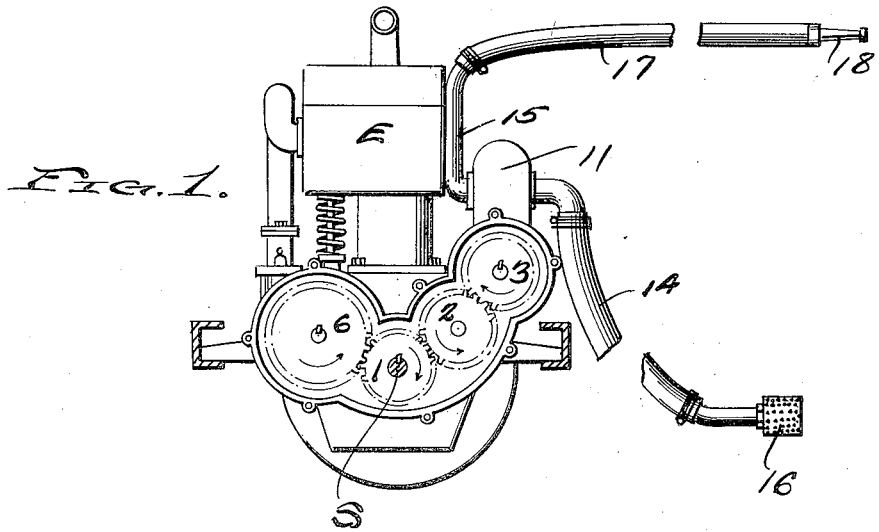
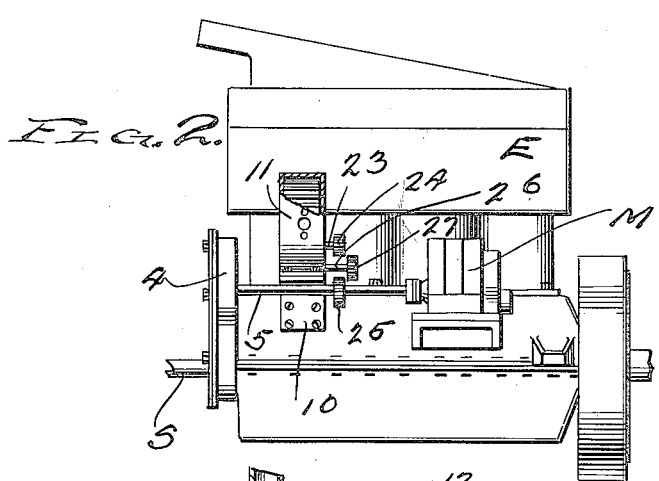
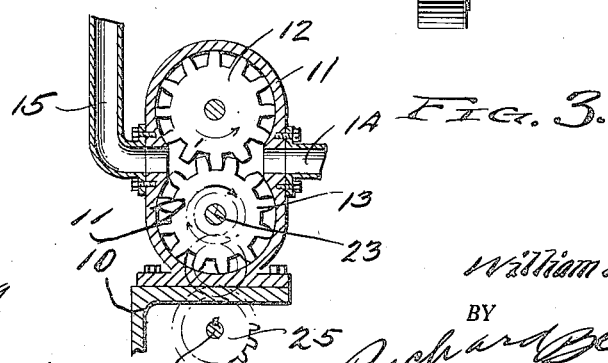
WITNESSES
INVENTOR.
William F. Warren
BY
ATTORNEY.

UNITED STATES PATENT OFFICE.

WILLIAM F. WARREN, OF SHELBURN, INDIANA.

AUTOMOBILE-PUMP.

1,346,866.  Specification of Letters Patent.  Patented July 20, 1920.

Application filed January 28, 1919. Serial No. 273,557.

*To all whom it may concern:*

Be it known that I, WILLIAM F. WARREN, a citizen of the United States, residing at Shelburn, in the county of Sullivan and State of Indiana, have invented certain new and useful Improvements in Automobile-Pumps, of which the following is a specification.

This invention relates to pumps, and more especially to those of the rotary type, involving intermeshing gears in the path of the water; and the object of the same is to locate a pump alongside an automobile engine and provide means whereby it may be thrown into connection with the engine shaft for pumping water whenever desired or for whatever purpose desired.

Another object is to provide special means whereby the pump can be set in motion or thrown out of action at will.

Details are set forth below, and attention is drawn to the drawings wherein,

Figure 1 is a front elevation of an automobile engine equipped with this invention.

Fig. 2 is a side view thereof.

Fig. 3 is an enlarged sectional detail of the pump itself.

Of the automobile engine E we are concerned only with the main shaft S and the magneto M. On said shaft is fastened a gear 1, meshing with another gear 2, and that in turn with a third gear 3 all within a casing 4, and the gear 3 drives the shaft 5 which drives the magneto M in a manner well understood. Another gear 6 meshes with the first gear 1 and drives the cams, but this detail is not important. It is sufficient for the purposes of the present specification that the magneto shaft 5 extends along one side of the engine.

A bracket 10 supports the casing 11 of the pump, which in the present instance is a pair of intermeshing gears 12 and 13 standing between the inlet 14 and the outlet 15. The inlet in the present case is a section of hose having a strainer 16 on its extremity. The outlet is connected to a section of hose 17 preferably having a nozzle 18 on its extremity. Obviously the strainer may be inserted into a stream of water or other source of water supply, and the nozzle may be handled so as to direct water onto the machine for washing purposes or so as to direct the same into the radiator when the water system has become depleted. In fact, I do not wish to be limited to the use of the hose nor the uses to which this invention may be put. It is quite possible if the parts are on a sufficient large scale to use the water flowing from the nozzle 18 for extinguishing fire, or for other purposes entirely foreign to its use in connection with the automobile itself.

The upper gear 12 of the pump runs idle and meshes with and is driven by the lower gear 13. The shaft 23 of the lower gear projects beyond the casing as best seen in Fig. 2 and carries a pinion 24. Mounted on the magneto shaft 5 is another pinion 25 in line with that numbered 24. On an idle shaft 26, or perhaps it might be called a stub shaft or pin projecting from the casing between the two shafts above mentioned, is slidably mounted a pinion 27 which may be pushed into mesh with both the pinions 24 and 25 when it is desired to drive the pump. The engine is then started, and rotary movement from the magneto shaft 5 is communicated to the pump in a manner which will be clear. When it is desired to throw the pump out of action, the motor is stopped and the idler 27 is slipped along on its pin as shown in Fig. 2, and thereafter the pump will be idle although the automobile engine is running. This is perhaps the simplest means for connecting it with a moving part of the machinery.

Having thus fully described my invention, what I claim as new and desire to secure by Letters Patent is:—

1. In a motor, the combination with the crank case and the crank shaft, of a magneto bracket secured to said crank case and situated adjacent one end thereof, a magneto mounted on said bracket, a magneto shaft extending from said magneto toward the other end of the motor, means for connecting said magneto shaft to said crank shaft, a gear wheel keyed to the magneto shaft intermediate its ends, an inverted L-shaped bracket carried by the crank case so as to overhang the magneto shaft adjacent said gear wheel, a pump situated on the inverted L-shaped bracket, and means for operating said pump through said gear wheel.

2. In a motor, the combination with the crank shaft and crank case, of a magneto bracket secured to said crank case, a magneto mounted on said bracket, a magneto shaft extending from said magneto, means for connecting said magneto shaft to said crank shaft, a gear wheel keyed to the magneto shaft, an inverted L-shaped bracket carried by the crank case so as to overhang the magneto shaft adjacent said gear wheel, a pump situated on the inverted L-shaped bracket, means for operating said pump through said gear wheel, an outlet pipe extending upwardly from the pump so as to be contiguous with the motor and to terminate adjacent the top thereof.

In testimony whereof I affix my signature in presence of two witnesses.

WILLIAM F. WARREN.

Witnesses:
W. E. DOUGLAS,
VICTOR M. BOYD.